(12) United States Patent  
Silver et al.

(10) Patent No.: US 7,768,712 B2
(45) Date of Patent: Aug. 3, 2010

(54) VARIABLE FOCUS LENS

(75) Inventors: Joshua David Silver, Oxford (GB); Chris Miksovsky, San Francisco, CA (US); Miranda Newbery, Oxford (GB); Andrew Robertson, Oxford (GB)

(73) Assignee: J & J Technologies Limited, London (GB)

( * ) Notice: Subject to any disclaimer, the term of this patent is extended or adjusted under 35 U.S.C. 154(b) by 0 days.

(21) Appl. No.: 12/091,934

(22) PCT Filed: Oct. 27, 2006

(86) PCT No.: PCT/GB2006/004019

§ 371 (c)(1),
(2), (4) Date: Oct. 15, 2008

(87) PCT Pub. No.: WO2007/049058

PCT Pub. Date: May 3, 2007

(65) Prior Publication Data

US 2009/0213471 A1 Aug. 27, 2009

(30) Foreign Application Priority Data

Oct. 28, 2005 (GB) ................................ 0522030.6
Jul. 10, 2006 (GB) ................................ 0613688.1

(51) Int. Cl.
*G02B 1/06* (2006.01)
(52) U.S. Cl. ....................................... 359/666; 359/665

(58) Field of Classification Search ................. 359/665, 359/666
See application file for complete search history.

(56) References Cited

U.S. PATENT DOCUMENTS

2006/0164731 A1 7/2006 Wu et al.
2008/0084532 A1* 4/2008 Kurtin ......................... 351/57

FOREIGN PATENT DOCUMENTS

| JP | 57-158802 A | 9/1982 |
| JP | 60-051801 A | 3/1985 |
| WO | 99/47948 | 9/1999 |
| WO | 01/75510 A | 10/2001 |
| WO | 02-063353 A2 | 8/2002 |

* cited by examiner

*Primary Examiner*—William C Choi
(74) *Attorney, Agent, or Firm*—Sughrue Mion, PLLC

(57) ABSTRACT

The invention relates to a variable focus lens (10), comprising a rigid ring (22), a flexible membrane (20) attached to the front surface of the ring, a rigid transparent front cover (40), attached to the flexible membrane (50), and a rigid rear cover (20) on the rear surface of the ring (22). A cavity (60) is formed between the flexible membrane (50) and the rear cover (20), and the cavity is filled with a liquid. The amount of liquid in the cavity can be varied to vary the curvature of the flexible membrane and so vary the optical characteristics of the lens. The rear cover can be integral with the ring, or formed separately. Further, a second flexible membrane can be positioned between the rear cover and the ring. The various parts of the lens can be held together by adhesive.

12 Claims, 5 Drawing Sheets

VARIABLE FOCUS LENS

CROSS REFERENCE TO RELATED APPLICATIONS

This application is a National Stage of International Application No. PCT/GB/2006/004019 filed Oct. 27, 2006, claiming priority based on Great Britain Patent Application Nos. 0522030.6 filed Oct. 28, 2005 and 0613688.1 filed Jul. 10, 2006, the contents of all of which are incorporated herein by reference in their entirety.

The present invention relates to a variable focus lens, and more particularly to a variable focus lens of simple construction suitable for mass-production.

Variable focus lenses are well known. They normally consist of a liquid-filled chamber, at least one face of which is formed by a transparent flexible membrane. As liquid is introduced into or removed from the chamber, the flexible membrane is deformed, and its curvature accordingly changes. This change in curvature leads to a change in the optical characteristics and power of the lens. The power of the lens can thus be varied simply by varying the amount of liquid in the chamber.

A prior art variable focus lens is disclosed, for example, in GB 2333858. This lens is formed from several interengaging rings. Flexible transparent membranes are trapped between the rings, and the rings are formed such that as they interengage, they serve to tension the flexible membranes (which improves the performance of the lens). One of the rings is then deformed to hold the assembly together. However, this design places certain requirements (such as ductility) on the materials used to form the rings, and also requires strict tolerances in the manufacturing of the rings. Further, each lens is formed from a large number of separate parts, which complicates manufacture.

According to the invention, there is provided a variable focus lens, comprising: a generally rigid ring with a front surface and a rear surface; a flexible membrane attached to the front surface of the ring; a generally rigid transparent front cover, attached to the flexible membrane; and a generally rigid rear cover on the rear surface of the ring; wherein a cavity is formed between the flexible membrane and the rear cover, the cavity being filled with a liquid, and wherein the amount of liquid in the cavity can be varied to vary the curvature of the flexible membrane and so vary the optical characteristics of the lens.

In the lens of the invention, the flexible membrane is held between the ring and the front cover, which may be formed with flat faces. This places less stringent requirements regarding tolerances on the parts of the lens, and so simplifies manufacture. Further, there is a wider choice of materials from which the lens can be formed.

In a preferred form, the rear cover and the ring are formed integrally, for example by moulding as a single piece. This reduces the number of steps required to assemble the lens. However, this is not a necessary feature, and in an alternative form, the rear cover is formed separately from the ring, and is attached to the rear surface of the ring.

In a further alternative form, the lens additionally comprises a second flexible membrane positioned between the ring and the rear cover, such that the second flexible membrane is attached to the rear surface of the ring and the rear cover is attached to the second flexible membrane. Such a lens has twice as much power as a single-membrane lens for a given lens cavity pressure (or allows the same power with half the cavity pressure).

Further, it will be appreciated that in all of these lenses, the flexible membranes are protected from damage, as they are behind rigid covers. The durability and toughness of the lenses is thus improved.

When the curvature of the flexible membrane is varied, the volume of the space between the flexible membrane and the front cover changes. As air is a gas, and so compressible, it is possible for movement of the flexible membrane to be accommodated by compression or rarefaction of the air in this volume. However, it is preferred for a vent hole to be formed in the front cover, to allow air in and out of the cavity.

The ring has a section through which liquid can be introduced into or withdrawn from the cavity. In a preferred form, this section is formed as a septum positioned in an opening in the ring. The septum is preferably formed from a self-healing material, which allows liquid to be introduced into and removed from the cavity by means of a syringe needle or the like inserted through the septum.

In a further preferred form, two or more septa are provided. This makes it easier to fill the cavity, as a needle pushed through one septum can be used to introduce liquid, and a needle pushed through the other septum can be used to withdraw air.

Preferably, the front cover and/or the rear cover has a negative or positive optical power.

It is also preferred for the refractive index of the liquid in the first cavity to be approximately equal to the refractive index of the material from which the rear cover is formed. This reduces the visibility of any flaws, scratches and the like on the inside of the rear cover.

Of course, any suitable method can be used for holding the ring, the flexible membrane and the covers together. However, it is preferred for the ring, the flexible membrane and the front cover are attached by means of adhesive. Further, when there is a second flexible membrane between the ring and the rear cover, it is preferred that the ring, the second flexible membrane and the rear cover are attached by means of adhesive.

Preferred embodiments of the invention will now be described by way of example only and with reference to the accompanying drawings, in which.

Figure 4:
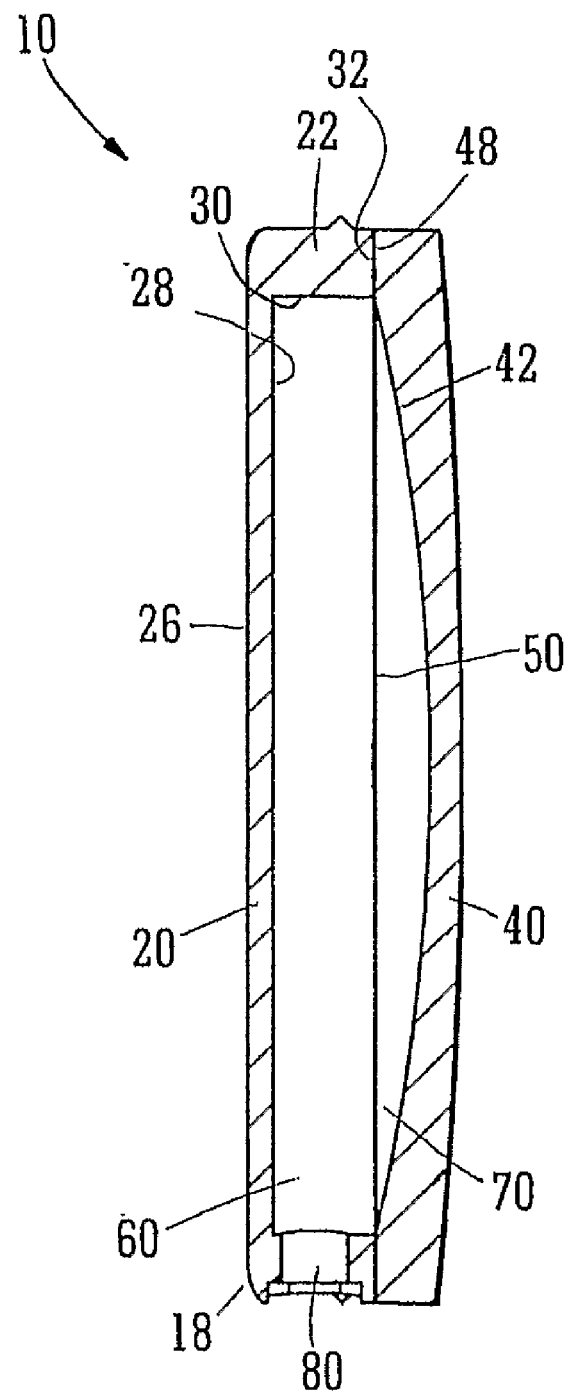
FIG. 4 is a cross-sectional view of the lens taken along line A-A in FIG. 3.

As best shown in FIG. 4, the lens 10 is formed from three main parts: a rear part 18, a front cover 40 and a flexible membrane 50.

The rear part 18 is in the form of a shallow dish, formed from a ring 22 and a rear cover 20 integrally formed with the ring. The flexible membrane 50 extends across the face of the shallow dish, and is attached to the front surface of the ring 22. The cavity 60 formed between the dish and the flexible membrane 50 is filled with a liquid, and the amount of liquid in the cavity 60 can be varied to change the volume of the cavity 60. The ring 22 and the rear cover 20 are generally rigid, and so changing the volume of the cavity 60 deforms the membrane 50 and thus varies the optical characteristics of the lens 10.

The front cover 40 is attached to the membrane 50, so that the membrane 50 is sandwiched between the ring 22 and the front cover 40. A second cavity 70 is formed between the membrane 50 and the front cover 40, and this cavity 70 contains air. A small vent hole 44 is formed in the front cover 40 and allows the second cavity 70 to communicate with the atmosphere. This allows the volume of air in the second cavity 70 to vary as the membrane 50 deforms. The vent hole 44 is positioned at the edge of the lens, and is as small as possible, to reduce any distraction caused to the user of the lens.

As shown in the drawings, the inner surface 42 of the front cover 40 (the surface facing the flexible membrane 50) is curved. This provides sufficient space for the flexible membrane 50 to be deformed, and thus allows the power of the lens 10 to be adjusted.

Figure 1:
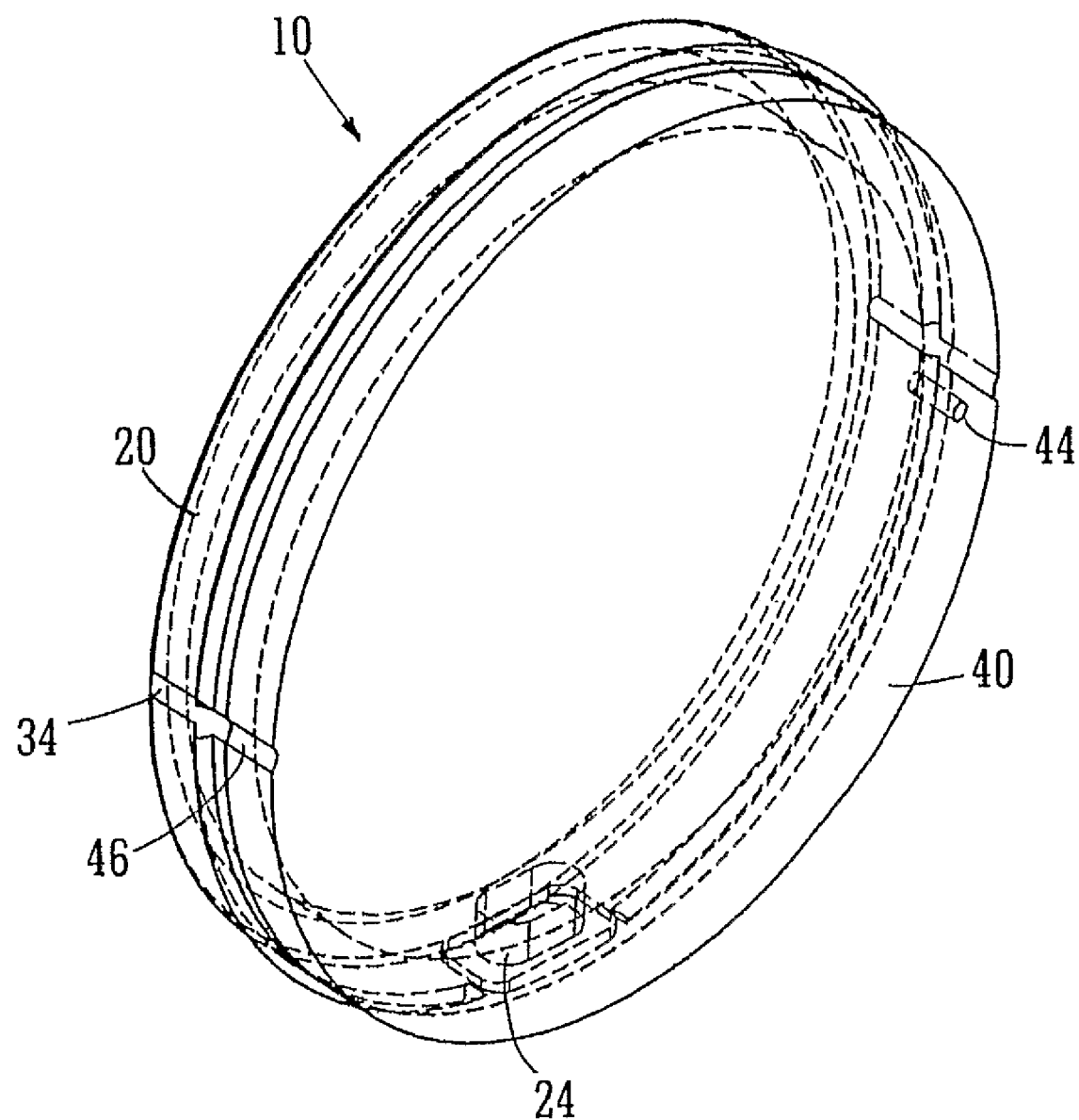
FIG. 1 is a perspective view of a first preferred embodiment of the lens.
Figure 2:
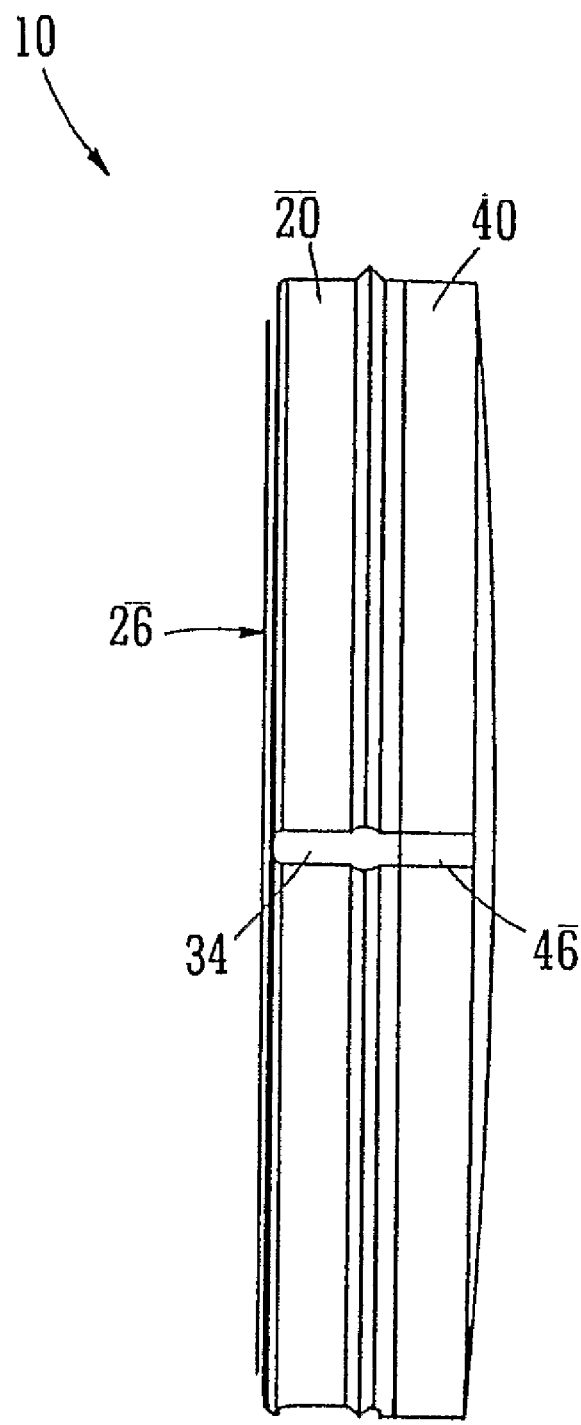
FIG. 2 is a side view of the lens.
Figure 3:
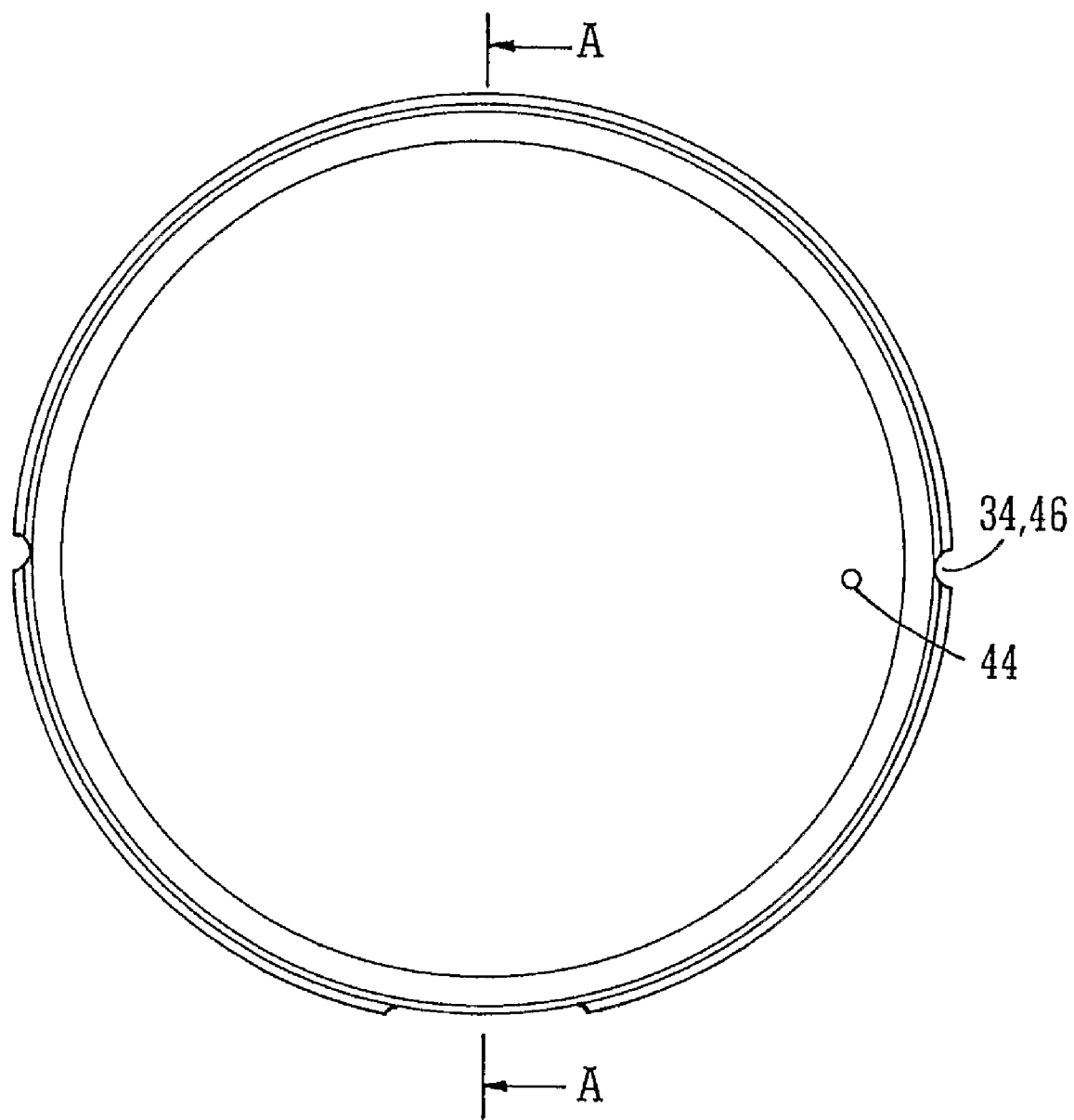
FIG. 3 is a front view of the lens.

There is an opening 24 in the ring 22 of the rear part (best seen in FIG. 1), and this opening 24 is normally sealed by a flexible plug 80 (hereinafter referred to as a "septum"). The septum 80 prevents liquid from leaking out of the cavity 60, and also prevents air leaking into the cavity 60, and so maintains the curvature of the membrane 50 (and so the optical characteristics of the lens 10) in a desired state.

The septum 80 is formed from a self-healing material. Such materials can be pierced by needles or the like, and reseal on removal of the needle. The use of such a material allows the amount of liquid in the cavity 60 to be adjusted through the use of such a needle.

To increase the amount of liquid in the cavity 60, the needle of a syringe containing liquid is pushed through the septum 80, so that the end of the needle penetrates the cavity 60. Liquid is then pushed from the syringe into the cavity 60. The increase in the amount of liquid forces the flexible membrane 50 to bow further outwards, changing the optical characteristics of the lens. Once the desired optical characteristics have been achieved, the needle is withdrawn from the cavity 60 and the septum 80. Because of the self-healing nature of the septum 80, the hole formed by the needle closes up, and the cavity 60 is sealed again.

A similar procedure is used to withdraw liquid from the cavity 60.

In order to ensure a good seal between the septum 80 and the opening 24 in the ring 22, the septum 80 can be inserted into the opening 24 while under tension, and then allowed to relax. When the septum 80 is put under tension, it stretches in a longitudinal direction, and so contracts in a lateral direction as a result of Poisson's ratio. While laterally contracted, the septum 80 can be correctly positioned in the opening 24, and the tension can then be released. The release of tension causes the septum 80 to return to its original width, which is ideally slightly greater than the width of the opening 24, to securely hold the septum 80 in place.

In an alternative form, the septum could be co-moulded with the rear part 18. In this method, the rear part is first moulded from a plastic material, with the opening in the ring being formed in this moulding step. Then, a plug of elastomer is moulded into the opening in a second moulding step, and this plug forms the septum. The materials used to form the rear part and the septum would be chosen so that they have good natural bonding, to ensure the septum stays firmly seated in the opening. It will be appreciated that such a co-moulding process could produce rear parts with septa more quickly and more cheaply than the two-step method described above.

In a preferred form, the front cover 40 is formed as a lens (ie the curvatures of its front surface and back surface are different). This allows the variable focus lens to have a greater maximum power (or a different range of powers) than could be achieved solely by deforming the flexible membrane 50.

For example, suppose that the range of powers that can be achieved solely by deforming the flexible membrane is from −5D to +5D. If a user requires a correction outside this range (say, −8D), then this cannot be achieved solely by deforming the flexible membrane. However, by providing the front cover with some lens power (say, −5D), the range of available powers is shifted to become from −10D to 0D, which covers the required correction. In a similar manner, if a higher positive power is required, this can be achieved by providing the front cover with some positive lens power.

Further, in some situations, it is desirable to ensure that the pressure of the liquid inside the cavity is above (or at least equal to) atmospheric pressure. If this pressure is maintained, then the flexible membrane will bow outwardly, which will tend to give the lens a positive power. If the lens as a whole is to provide a negative power, then this must be achieved by providing at least one of the front cover and the rear cover with a negative power.

A currently preferred process for manufacturing the variable focus lens will now be described.

Firstly, the rear part 18 is formed, for example by moulding acrylic, or by machining and polishing. Depending on the quality of the moulding, the surface 26 which in use faces the user's eye can be left in its as-moulded form; alternatively, this surface 26 may be polished to improve its smoothness. The interior surfaces 28, 30 are also machined to shape. The opening 24 for the septum 80 can be formed in the moulding process, or it can be machined after moulding. A combination of moulding and machining can also be used to form the opening 24.

The septum 80 is then formed, from cast silicone. In a preferred form, the cast silicone has a Shore hardness of between 30A and 40A. The silicone septum is then primed (for example, by brushing on Loctite 770 primer), and a cyanoacrylate glue (such as Loctite 403) is applied to it.

The septum 80 is then pulled into the opening 24 in the rear cover. This pulling stretches the septum 80, and so causes it to reduce in width, allowing it to fit into the opening 24. Once the septum 80 is positioned correctly, the tension is released, and the septum attempts to return to its original size, which causes it to seat firmly in the opening 24. This ensures a good seal between the septum 80 and the opening 24.

Any excess glue is then wiped away from the septum 80. Further, once the glue has cured, the inwardly-protruding "tail" of the septum is trimmed away, so that the septum is flush with the inner wall 30 of the ring 22. This reduces the intrusion of the septum 80 into the visual field of the user.

The flexible membrane 50 is then prepared. In a preferred form, this is made from a sheet of polyester film such as Mylar, and in particular from Mylar DL, which has good optical qualities. The sheet can also be treated (on one or both sides) to improve its adhesion qualities. The sheet is then put under tension.

A thin bead of ultraviolet-curing adhesive (such as Loctite 3105) is applied to the front surface 32 of the ring 22 which will, in the assembled state, confront the front cover 40 (and contact the membrane 50). The front surface of the ring 22 of the part 18 is then rested on the sheet, so that the adhesive comes into contact with the sheet.

The assembly of the rear part 18 and the sheet is then exposed to an ultraviolet light source to cure the adhesive. This can be any suitable source, and it is possible to simply expose the assembly to bright sunlight to cure it.

Once the adhesive is cured, the sheet is cut to match the contour of the ring 22. This may be done in two phases; a first rough-cut phase, to release the assembly from the rest of the sheet, and a second trimming phase, in which the part of the sheet adhered to the ring is trimmed to match the ring.

The front cover 40 is then formed. Any suitable method and material can be employed; in a preferred form, the front cover 40 is moulded or machined and polished from polycarbonate. The front cover 40 may also be formed from a standard moulded spectacle lens, cut to the appropriate shape.

It will be noted that the front cover 40 and the ring 22 of the rear part 18 are both formed with two diametrically opposed longitudinal grooves 34, 46 in their side surfaces. These grooves 34, 46 serve to ensure that the front cover 40 and rear part 18 are correctly aligned during their assembly, which will now be described.

During assembly, the assembly of the rear part 18 and the membrane 50 is fitted into an indexing feature, membrane 50 upwards. This feature has two projecting ridges, which engage with the grooves 34 on the rear part 18. When the rear part 18 is properly fitted into the indexing feature, its position is defined by the engagement of the ridges with the grooves 34.

Of course, other indexing features could be used, for example, a jig with counterbores that reference the outer profile of the covers. This may be preferable in some cases, as the grooves 34, 46 can have an impact on the aesthetics of the lens.

A thin bead of ultraviolet-curing adhesive (such as Loctite 3105) is applied to the surface 48 of the front cover 40 which will, in the assembled state, confront the ring 22 (and contact the membrane 50). It will be appreciated that this step can take place before or after the assembly of the rear part 18 and the membrane 50 is fitted into the indexing feature.

The front cover 40 is then also fitted into the indexing feature, adhesive side downwards. It rests on the membrane 50, so that the adhesive comes into contact with the membrane, and as before, is exposed to ultraviolet light (which may again be sunlight) to cure the adhesive.

Once the adhesive has cured, the lens assembly 10 is removed from the indexing feature. The cavity 60 formed between the rear cover 20, the ring 22 and the membrane 50 is filled with a liquid such as oil by means of a needle inserted through the septum 80, and adjustment of the amount of liquid in the cavity 60 to achieve correct focus of the lens 10 can be carried out at this stage.

Once the cavity 60 is filled with oil, the outer side of the septum 80 is trimmed away, so that the septum 80 is flush with the outer wall of the ring 22. This gives the lens 10 a smooth outer contour, and makes it easier to fit the lens into spectacle frames.

As a final step, two such lenses are fitted into a frame, to produce a pair of spectacles. If desired, the frames can have openings, aligned with the septa of the lenses, to allow a needle to be inserted through the frame and the septum of a lens to allow further fine adjustment of the focus of the lens.

In the lens described above, there is a single opening 24 in the ring 22 of the rear part 18, closed by a single septum 80. In an alternative form, the side wall of the rear cover can have two openings, each closed by a septum.

This twin-septum design has a number of advantages with regard to filling the cavity. For example, if the septa are generally diametrically opposite each other, then the lens can be positioned with one septum above the other. Liquid can be introduced into the cavity by means of a needle pushed through the lower septum, and air can be withdrawn from the cavity by means of a second needle pushed through the upper septum. This filling method reduces the number of air bubbles in the cavity once it is filled with liquid, and so improves the optical quality of the lens.

It is preferred that the refractive index of the liquid in the cavity 60 is approximately equal to the refractive index of the material used to form the rear cover 20.

As mentioned above, some machining of the rear part 18 is required to bring it to the desired shape, and in particular, the surface 28 of the rear cover 20 which forms part of the cavity is machined. It is possible to machine this surface 28 in such a way as to avoid scratches; however, this requires expensive machining processes, and this leads to an increase in the cost of the lens 10.

A cheaper approach is to ensure that the refractive indices of the liquid and the rear cover material are approximately equal. If this is so, then there will be no refraction of a light ray passing from the liquid into the rear cover, and any scratches on the surface of the rear cover will be effectively invisible.

It will be appreciated that the above detailed description is only concerned with one particular structure of lens, and other similar structures can be used. Two such structures will now be briefly described with reference to FIGS. 5 and 6.

Figure 5:
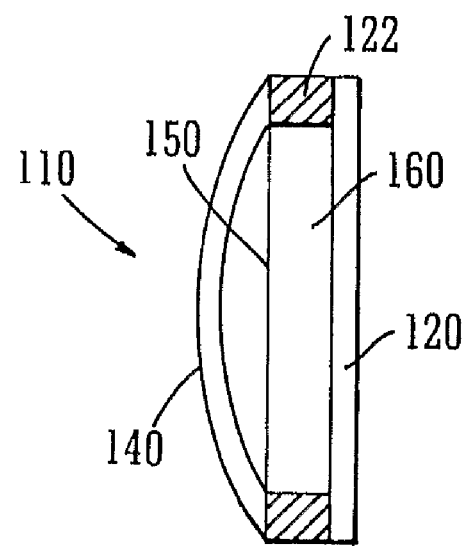
FIG. 5 is a cross-sectional view of a second embodiment of the lens.

In the lens 110 shown in FIG. 5, the rear cover 120 and the ring 122 are formed as separate parts, and are attached to each other by adhesive. This can be a first step in the assembly process described above, prior to formation and attachment of the septum. The flexible membrane 150, the front cover 140 and the cavity 160 are all analogous to those shown in FIG. 4.

Figure 6:
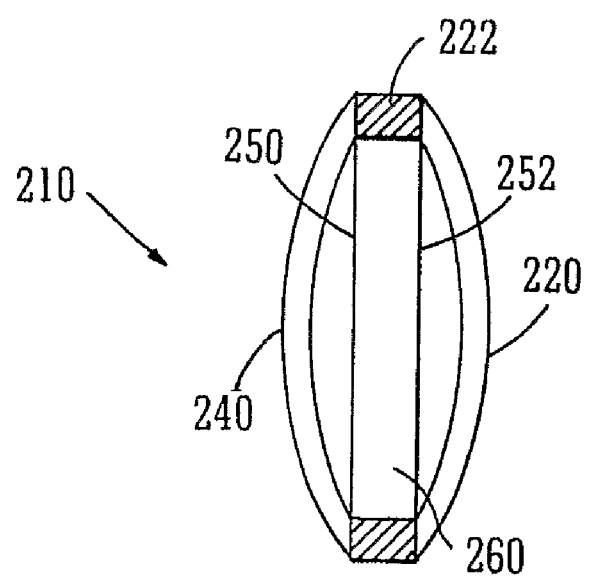
FIG. 6 is a cross-sectional view of a third embodiment of the lens.

In the lens 210 shown in FIG. 6, the rear cover 220 and the ring 222 are again formed as separate parts. Further, a second flexible membrane 252 is positioned between the ring 222 and the rear cover 240 (which is will be seen is curved to allow the membrane to deform). Thus, the cavity 260 is defined by the flexible membranes 250, 252 and the ring 222.

The presence of two membranes gives the lens twice as much power as a single-membrane lens for a given lens cavity pressure (or allows the same power with half the cavity pressure). Although such a lens may be thicker than the lens shown in FIGS. 1 to 5, this may not be consequence, depending on the use to which the lens is put (for example, in instruments).

The invention claimed is:

1. A variable focus lens, comprising:
   a generally rigid ring with a front surface and a rear surface;
   a flexible membrane fixed to the front surface of the ring;
   a generally rigid transparent front cover, fixed to the flexible membrane; and
   a generally rigid rear cover on the rear surface of the ring;
   wherein a cavity is formed between the flexible membrane and the rear cover, the cavity being filled with a liquid, wherein the ring has a section through which liquid can be introduced into or withdrawn from the cavity, and wherein the amount of liquid in the cavity can be varied to vary the curvature of the flexible membrane and so vary the optical characteristics of the lens.

2. A variable focus lens as claimed in claim 1, wherein the rear cover and the ring are formed integrally.

3. A variable focus lens as claimed in claim 1, wherein the rear cover is formed separately from the ring, and is fixed to the rear surface of the ring.

4. A variable focus lens as claimed in claim 1, additionally comprising a second flexible membrane positioned between the ring and the rear cover, such that the second flexible membrane is fixed to the rear surface of the ring and the rear cover is fixed to the second flexible membrane.

5. A variable focus lens as claimed in claim 4, wherein the ring, the second flexible membrane and the rear cover are fixed by means of adhesive.

6. A variable focus lens as claimed in claim 1, wherein a vent hole is formed in the front cover to allow air in and out of the cavity.

7. A variable focus lens as claimed in claim 1, wherein the said section is formed as a septum positioned in an opening in the ring.

8. A variable focus lens as claimed in claim 7, wherein the septum is formed from a self-healing material.

9. A variable focus lens as claimed in claim 7, wherein two or more septa are provided.

10. A variable focus lens as claimed in claim 1, wherein the front cover and/or the rear cover has a negative or a positive optical power.

11. A variable focus lens as claimed in claim 1, wherein the refractive index of the liquid in the cavity is approximately equal to the refractive index of the material from which the rear cover is formed.

12. A variable focus lens as claimed in claim 1, wherein the ring, the flexible membrane and the front cover are fixed by means of adhesive.

* * * * *